June 20, 1944.　　T. G. MOULDING　　2,351,778
SEAT ADJUSTING DEVICE
Filed Nov. 1, 1939　　4 Sheets-Sheet 1

INVENTOR
THOMAS G. MOULDING
BY
ATTORNEY

June 20, 1944.  T. G. MOULDING  2,351,778
SEAT ADJUSTING DEVICE
Filed Nov. 1, 1939  4 Sheets-Sheet 2

INVENTOR
THOMAS G. MOULDING
BY
ATTORNEY

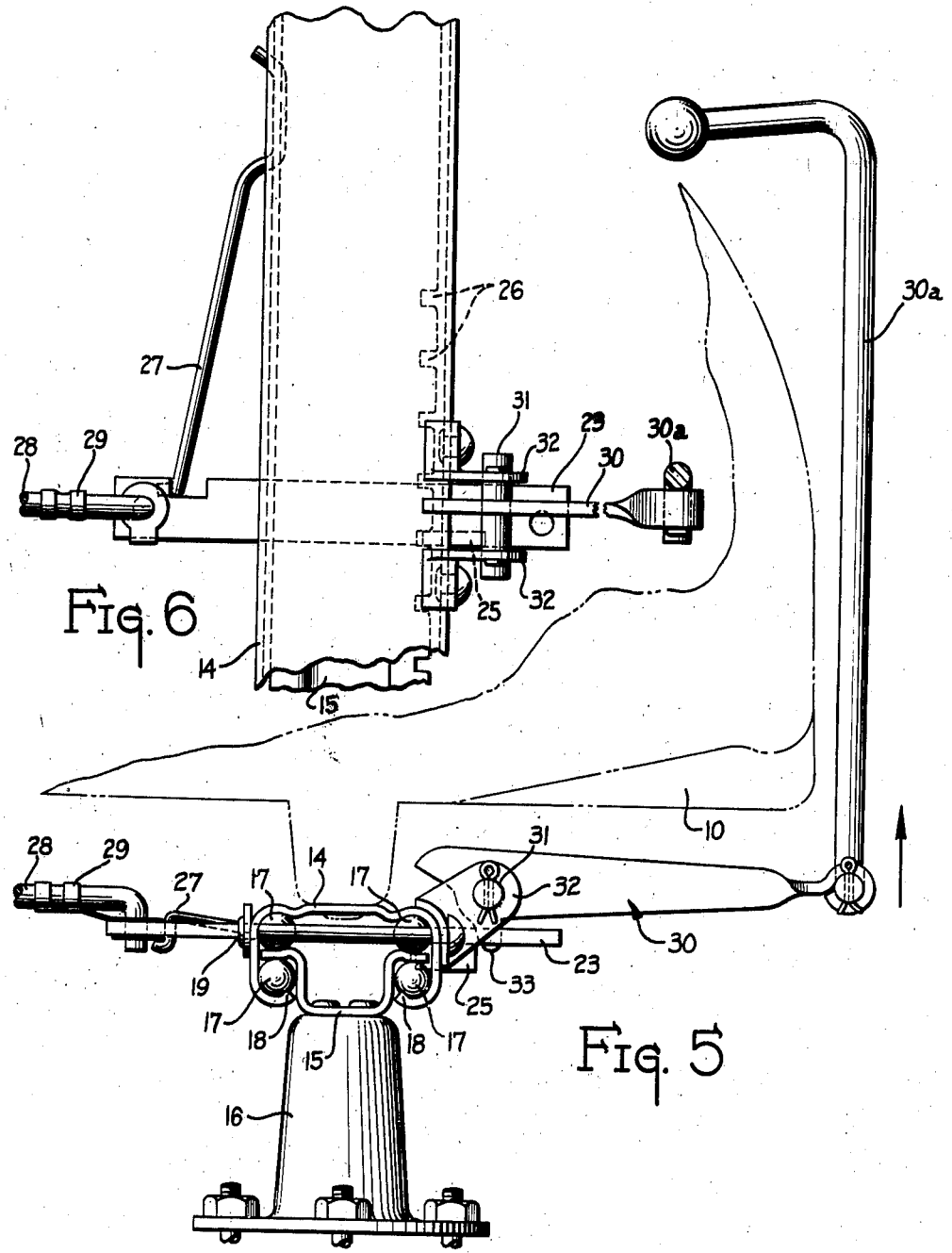

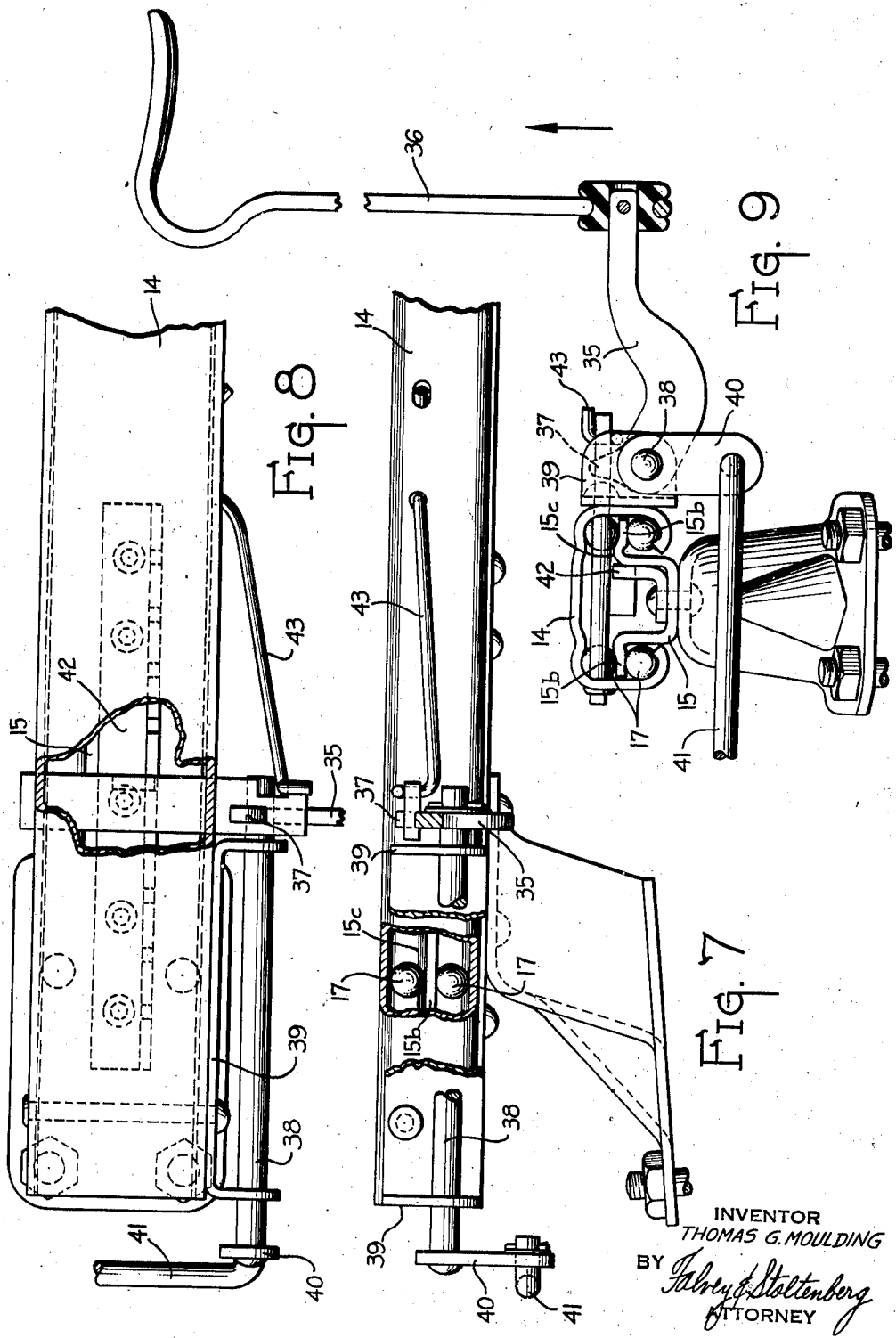

Patented June 20, 1944

2,351,778

UNITED STATES PATENT OFFICE 2,351,778

SEAT ADJUSTING DEVICE

Thomas G. Moulding, Toledo, Ohio

Application November 1, 1939, Serial No. 302,273

8 Claims. (Cl. 155—14)

This invention relates to seat adjusting devices, more particularly to seat adjusting devices adapted for horizontal adjustment, in which spherical members are utilized as anti-friction means.

Ball bearings have been utilized in the prior art to provide an easy-sliding seat-adjusting device but these devices were not satisfactory, due to the fact that the spherical anti-friction devices or ball bearings were unstable in a lateral direction, the spheres serving as anti-friction members in the lateral axis as well as in the longitudinal axis of the runners, so that lateral displacement often resulted and disaligned the runners. The present invention contemplates the provision of a construction in which the spherical anti-friction devices are positioned in spaced relation both in the longitudinal and lateral axes of the runners, so that the longitudinal motion of the runners is relatively easy to attain and the relative lateral motion of the runners is substantially prevented. The lateral motion of the runners is undesirable and is substantially prevented in the contemplated construction by the application of load force on the anti-friction devices to act constrictively along convergent lines so as to balance the lateral force components. Vertical surfaces are contemplated to cooperate with the ball bearings positioned on both the movable and stationary runners to further prevent relative lateral displacement.

The construction contemplates the provision of runners contoured in a manner whereby the transmission of forces from a movable member or runner to a fixed member or runner is attained by components acting at a convergent angle whereby the force components are directed inwardly to a central neutral point which substantially balances the components of the forces against each other. In this manner, the forces acting upon the spaced spherical members act at an angle, so that the lateral components of the forces act against each other to create a constrictive action which gives lateral stability to the structure.

One of the problems of the prior art has been to prevent "racking" or binding of the seat during its adjustment from one position to another, particularly when the force to move the seat is applied unequally to the runners. To solve this problem, rotating cross bars have been supplied which were generally provided with pinions at their ends to cooperate with racks on one portion of each of the runners, which allowed the movable portion of one runner, as it changed its position, to transfer this movement to the opposite movable member by means of the pinion on the cross bar cooperating with its rack. This construction had the disadvantage that it allowed considerable movement in each runner with reference to the other arising from manufacturing tolerances, so that difficulty was often experienced by binding and in obtaining a proper locking action of the latch means for the runners when disposed in their newly adjusted position.

The present invention contemplates the provision of a seat adjusting device in which the rotating cross bar is completely eliminated and a structure is provided in which the parallelism of the runners is maintained during movement of the seat to the different adjusted positions to prevent binding or "racking." In the prior art structures, the greater the weight carried by the seat, the greater the difficulty experienced due to the non-parallel movement in the sets of runners. In the contemplated structure, the greater the weight positioned upon the seat, the greater tendency there is to prevent non-parallel action on the part of the runners.

The contemplated construction, furthermore, has the advantage of decreasing the number of parts which considerably decreases the cost of manufacture. A latching mechanism is also provided which gives greater certainty of action and always locks the seat runners in the same parallel relation.

It is, therefore, an object of this invention to provide a seat adjusting device utilizing spherical anti-friction devices which are spaced both in the lateral and the longitudinal axes of the runners, so that longitudinal movement of the runners is easily attained, while the lateral movement of the runners is substantially prevented by transmitting forces between the runners by convergent components and opposing the lateral forces applied to the spherical anti-friction devices.

It is a further object of this invention to provide a seat adjusting device which utilizes anti-friction devices between all contiguous surfaces so as to obtain a maximum ease of movement between the runners of the device.

It is a further object of this invention to provide a seat adjusting device in which spherical anti-friction members cooperate with horizontal and vertical surfaces on movable and stationary runner portions whereby anti-friction members will be effective to promote easy relative motion for the runner portions and provide stability by being spaced for the transmission of forces at several points.

It is a further object of this invention to provide a seat adjusting device in which binding or "cocking" is prevented between the runner portions by providing anti-friction members active between vertical surfaces of the runners, which dispenses with the necessity of rotating cross bars between the seat runners.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawings forming a part of this specification wherein like reference characters designate corresponding parts in the several views.

Figure 5 is an end elevational view, showing the complete mechanism illustrated in part in Figure 4 in its relation to the seat block.

Figure 6 is a plan view of a part of the device shown in Figure 5.

Figure 7 is a side elevational view of another form of latch mechanism.

Figure 8 is a plan view, partly in section of the mechanism illustrated in Figure 7.

Figure 9 is an elevational end view of the device illustrated in Figure 7.

Figure 1:
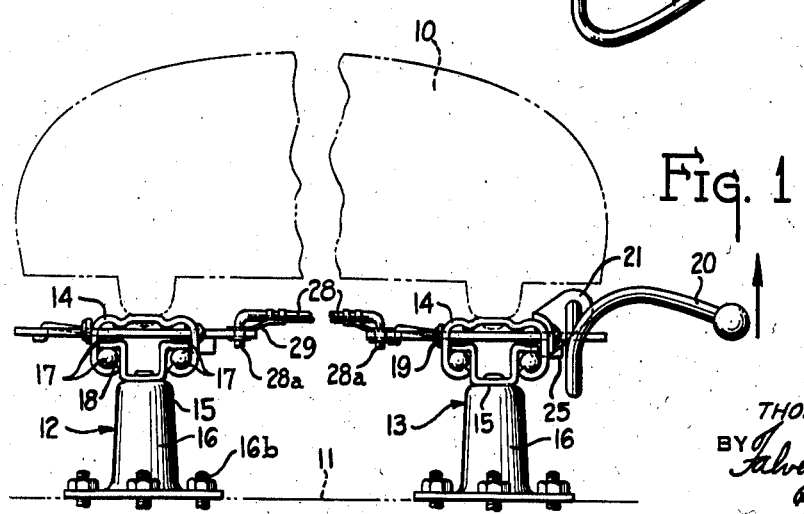
Figure 1 is an end elevational view of the seat adjusting device of the present invention.

Referring to Figure 1 of the drawings, a seat block 10 is shown which may be of standard construction such as is utilized in automobiles and is adapted to be moved in a horizontal direction with relation to a fixed plane or surface 11 so as to determine the seating relation of an operator with reference to a steering device or the like. To obtain movement of the seat block 10 with relation to the fixed surface 11, a pair of runners 12, 13 is provided, comprising movable portions 14 which are adapted to be attached to the movable seat block 10 and fixed portions 15 which are adapted to be attached to the fixed surface 11 by means of rigid upstanding brackets 16. The movable and fixed portions of the runners are adapted to cooperate together through the medium of spherical anti-friction members 17 in the nature of ball bearings to form an easy-sliding adjustable relation between them. Means are also provided to lock the runners in fixed relation after the predetermined adjustment has been made, and the structures whereby these results are attained are described in detail hereinafter.

Figure 2:
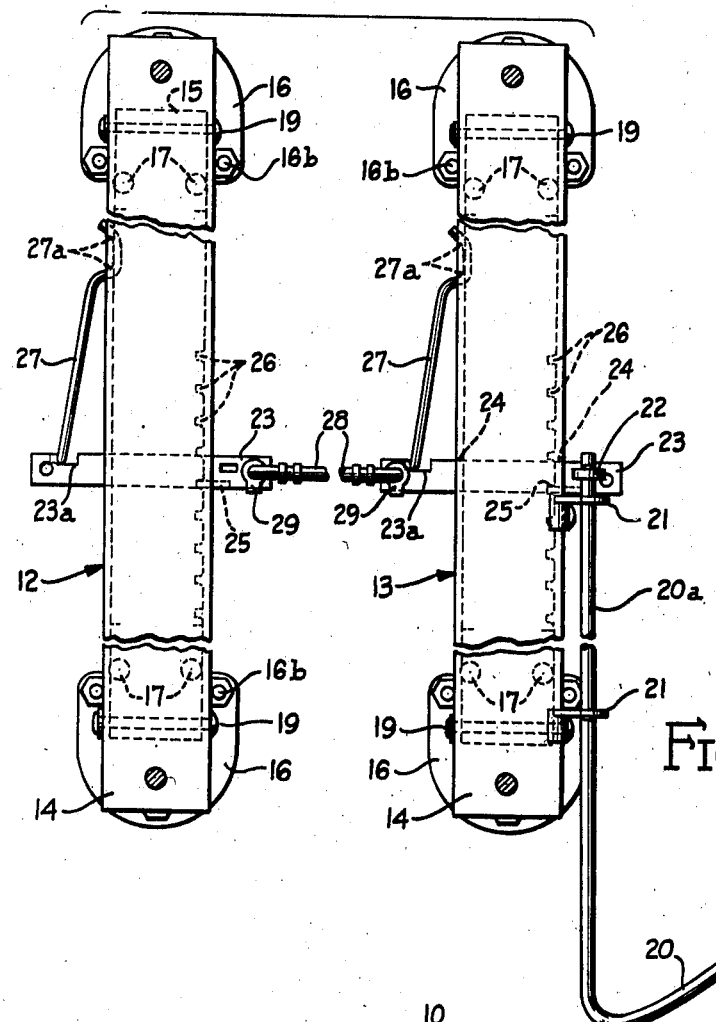
Figure 2 is a plan view of the runners.

The fixed portion 15 of a runner is an elongated channel whose vertical sides 15a are provided with outwardly extending flanges 15b. The base of the channel 15 is attached to the brackets 16 by means of rivets 16a which are, in turn, attached to the fixed surface 11 by bolts 16b and thereby hold the channel 15 in fixed relation with the surface 11 by supporting the same at its ends as is clearly shown in Figure 2. The brackets 16 may be conformed to suit the contour of the fixed surface 11 and may vary widely as is shown in Figures 1 and 7.

The outwardly extending flanges 15b are preferably integral with the vertical portions 15a of the channel and are provided with raised portions 15c at their inner side, preferably adjacent the point where they are joined to the vertical sides 15a of the channel. The raised portions may take the form of a rounded section, extending longitudinally of the flange, and are provided to serve as abutments against which the spherical anti-friction means or ball bearings 17 are adapted to ride, so that they may be held in position on a runway 15d formed by the outer section of the flange. The abutments 15c also serve to carry lateral force components which are applied thereto by the ball bearings 17 as will be described hereinafter.

Figure 4:
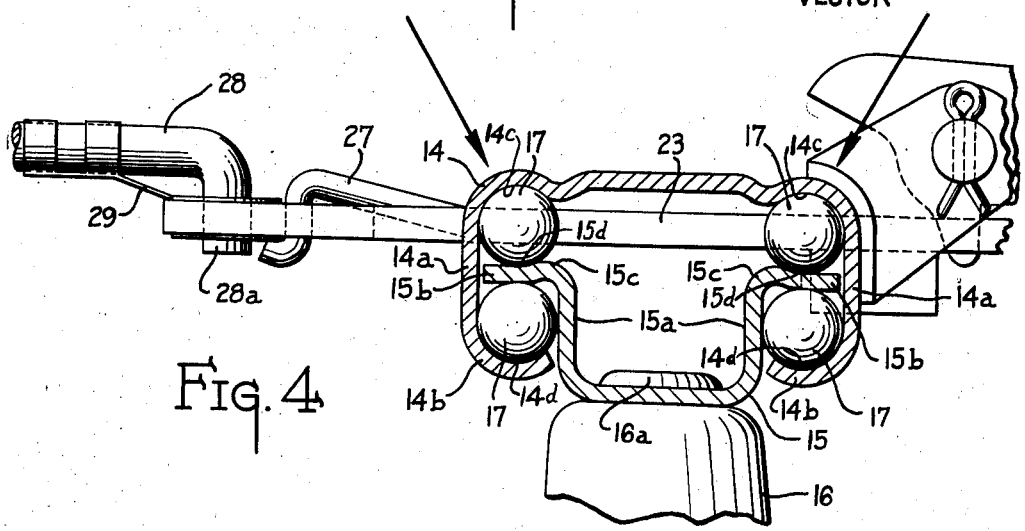
Figure 4 is an enlarged sectional view taken along the line 4—4 of Figure 3.

The movable portion or member 14, which is attached to the seat block 10 is also an elongated channel which is adapted to embrace the channel-shaped fixed portion 15 as is most clearly shown in Figure 4. The outer movable portion 14 is provided on its vertical sides 14a with inturned flanges 14b which extend inwardly toward the base of the fixed channel 15 to form a cooperative relation with the vertical sides 15a thereof. The sides 14a of the outer channel are proportioned to cooperate with the outwardly extending flanges of the fixed inner channel with a slight clearance, so that the inner member may readily slide within the outer member without direct contactual relation between the flanges, both inturned and outturned, with their cooperating channel, all contact being provided by the rolling contact of the ball bearings.

The base of the outer channel 14 and the inturned flanges 14b are preferably given aligned semi-circular contours extending in a longitudinal direction, whose radius of curvature in the transverse axis is approximately the same or slightly larger than the radius of the spherical anti-friction means for which these semi-circular contours form runways 14c and 14d. The runways 14c and 14d in the base of the channel 14 and the inwardly extending flange 14b are spaced in a vertical direction to provide a close fit for two anti-friction means positioned on opposite sides of each of the outwardly extending flanges of the inner channel which are juxtaposed between, as is clearly shown in Figure 4. This relation is provided between the outer and inner channels at both sides of the channel members. The inwardly extending flanges are slightly "sprung," so that tensile stress will be placed upon the sides 14a when the anti-friction members are mounted in position, which tends to press the spherical anti-friction members 17 into close contactual relation with the outwardly extending flange 15b. In this manner, the resiliency of the material will maintain a close contactual relation between the runways and the anti-friction means to provide a smoothly operating device which will also be quiet inasmuch as the parts are resiliently held together to prevent rattling.

Four spherical anti-friction members are preferably provided to act together as a group between the inner and outer members as is clearly shown in Figure 4. Stops 18, which may be struck up nibs, are provided in the lower runways and on the outwardly extending flanges to limit the movements of the anti-friction means, while in the upper runways, rivets 19, which thread aligning apertures in the sides 14a of the outer channel, prevent movement of the spherical anti-friction members beyond a predetermined limit in the other direction. These stops also tend to keep the anti-friction members grouped in close cooperative relation so as to maintain the parts of the runner under tension as has already been described. Several groups of anti-friction members may be provided in spaced longitudinal relation to act between the outer and inner channels but at least two groups are used in the preferred embodiment disclosed in the drawings.

The longitudinal displacement of the groups of anti-friction means provides several spaced points in both the longitudinal and transverse axes of the runners by which the movable member under load transmits the load to the fixed member. This spacing also prevents "racking" or binding of the movable member upon the fixed member when load forces are applied to the runners at asymmetrical locii such as is indicated by vectors in Figure 3. The asymmetrical force, such as generally applied by an operator seated at an end of the seat block during the adjusting period tends to create a couple acting in a lateral direction about the distal runner. The anti-friction means acting between the vertical surfaces 14a of the outer channel and the vertical surfaces 15a of the inner channel prevent the couple from creating a disalignment between the inner and outer channels which is often the cause of "racking" or binding. The ball bearings acting between these vertical surfaces provide an easy gliding contact which allows relative movement in a longitudinal direction between the inner and outer channels in such a manner as to correct unfavorable force conditions and obviate the formation of the couple. The easy gliding relation between the horizontal and the vertical surfaces of the runners as provided by the ball bearings will prevent any "racking" or binding, and facilitate longitudinal adjustment.

Referring to Figure 1, a manually-controlled means is provided to cooperate between the two relatively adjustable channel-shaped members to lock them in adjusted position. A handle 20, which is suited for manual manipulation by the operator, is positioned conveniently with reference to the seat block 10. Brackets 21, which are preferably riveted to the movable member 14, journal a longitudinally extending portion 20a of the handle and preferably maintain the portion 20a in a position displaced relatively above the outer channel-shaped member 14. Keyed to the end of the longitudinally extending section 20a, a cam member 22 is provided to cooperate with a transverse latch bar 23 by engaging an aperture therein. The transverse bar 23 is adapted to be reciprocated thereby in rectangular apertures 24 formed in the sides of the movable channel-shaped member 14. A downwardly extending lug 25 is provided on the transverse bar 23 to cooperate with an opening, which is preferably an extension of the aperture 24, to cooperate with the edge of one of the outwardly extending flanges 15b of the inner channel-shaped member 15. The edge of the flange 15b is provided with notches 26 spaced at predetermined distances, into which the lug 25 is adapted to seat and thereby provide a locking relation between the channel-shaped members, which prevents relative longitudinal movement between them.

Suitable spring means such as a spring wire 27 is provided to thrust the transverse bar 23 in a direction to seat the lug 25 into the notches 26. The spring wire 27 is adapted to cooperate at its forward end with a notch 23a formed in the transverse bar, while its other end is anchored to the outer channel-shaped member 14 in any convenient manner, as for example, by threading spaced apertures 27a.

The other runner 12 is similarly provided with a locking mechanism to selectively hold the members against relative longitudinal movement. Inasmuch as transverse bars of both runners are held in locked relation by their springs 27, it is essential to release transverse bars 23 of both simultaneously to move the seat block, and this end is conveniently attained by the use of only one manual means. A transverse rod 28 is provided which ties the transverse bars 23 of the runners 12 and 13 together, so that they are capable of being actuated substantially simultaneously by manual manipulation of the handle 20. Downwardly extending portions 28a on rod 28 cooperate with apertures formed in the adjacent ends of the transverse bar. Saddle means 29 are provided at the point of cooperation between the transverse rod 28 and the transverse bar 23 to hold the rod and the bars in cooperative relation. The rod 28 preferably transmits force from the transverse rod 23 positioned on the runner 13 to the transverse rod on the runner 12 by tensile stress. In this manner, the transverse bars of both runners 12, 13 may be reciprocated substantially simultaneously through manual manipulation of the handle 20 to release the lugs from the notches on the outwardly extending flange of the inner channel to allow longitudinal adjustment of the runners. After the release of the handle 20, with the seat block in its newly adjusted position, springs 27 will urge the transverse bars in a direction so as to reengage the lugs with their cooperating notches to maintain the runners in locked position.

A novel feature of the structure disclosed resides in the manner in which load forces are transmitted between the movable and fixed portion of the runners whereby an unusual degree of stability is attained and at the same time ease of motion during the adjusting period and freedom from "racking" or binding is not sacrificed. The ball bearings in this structure are maintained in spaced relation both in horizontal and vertical axes so as to define planes in which load forces are transmitted from one portion of the runner to the other. The positioning of the ball bearings between vertical surfaces on the runner portions prevents undesirable relative lateral motion between the runner portions which often causes "racking" or binding of the movable portion on the fixed portion as described above, particularly during the period in which it is being adjusted to a new position.

The channel-shaped members of the runners are inherently stiff, which is increased further by the longitudinal corrugations or runways to provide a rigid supporting structure. The upper anti-friction members, which carry the normal load as imposed by the seat block, tend to transfer the load to the flanges on the inner channel-shaped member along the lines of the vectors illustrated in Figure 4. The vectors have a horizontal component acting in a lateral direction having reference to the runners so as to abut the ball bearings against the raised portions 15c on the inner channel member which tends to balance the horizontal components. This action further increases the stability of the seat adjusting device by tending to prevent relative lateral motion between the inner and outer members; the greater the load force, the greater the horizontal components, and the greater the constrictive force.

Figure 3:
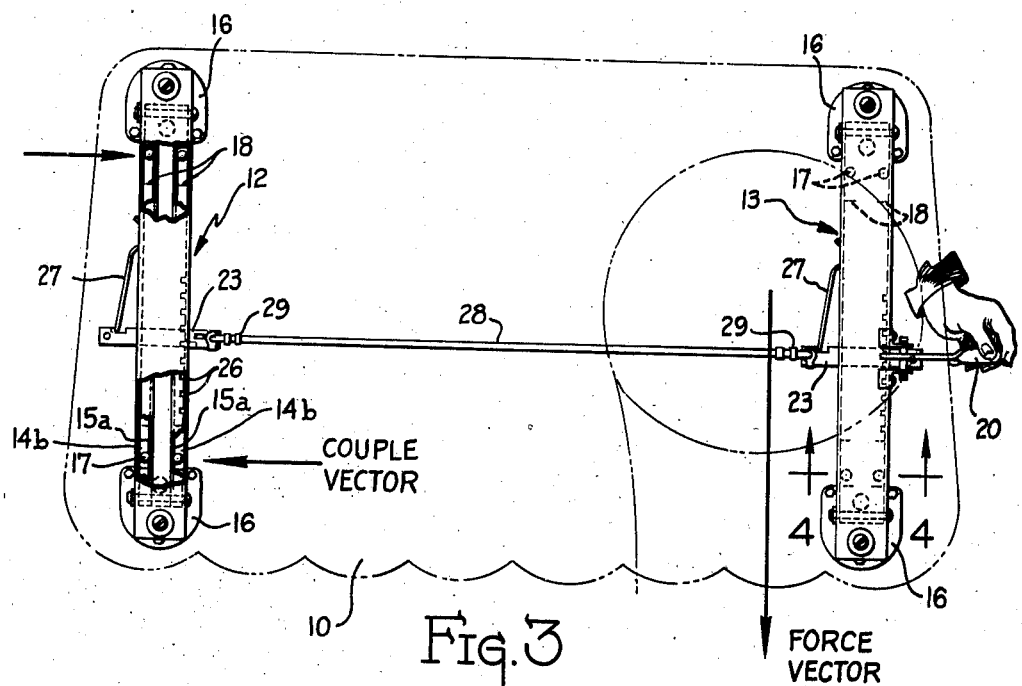
Figure 3 is a plan view, partly in section, showing the runners positioned on the seat block, and a locus of force application to adjust the seat.

When the seat is to be adjusted, a force must be applied to the seat block in a longitudinal direction of the runners to create a relative motion between the outer and inner members of each of the runners 12, 13. An operator seated in the driver's position behind the steering wheel, normally sits adjacent one end of the seat block as is indicated in Figure 3 by the dotted lines adjacent the right end of the figure. From this position, the operator can conveniently avail himself of the handle to reciprocate the transverse bars 23 to release lugs 25 from their locking relation with the notches on the edges of the outwardly extending flanges. After the locking relation has been terminated, the operator applies a horizontal force to the seat block which he may obtain by placing his feet upon the floor and pulling forward upon the seat block as is indicated by the vector in Figure 3. The vector force applied asymmetrically to the seat block tends to create a couple acting on the left runner as is shown by the other vectors in the same figure. Inasmuch as the inner portion of the runner is fixed and does not have the couple applied to it, there is a tendency to disalign the portions of the runner and unless special provision is made to counteract the effect of the couple, there will be a tendency to bind or "rack." In the present structure, the ball bearings positioned between vertical surfaces overcome this binding action by creating an easy gliding relation between the inner and outer member which allows ready movement of the outer member in a direction to overcome the non-alignment and, therefore, prevents the formation of the couple. In this manner, "racking" or binding is substantially prevented and a seat adjusting device is provided which eliminates the use of the cross bar as described above.

In Figures 3, 4, 5, and 6 a modification of the latching device is illustrated, in which the handle adapted for manual manipulation is made integral with the cam for actuating the transverse bar 23 which engages and disengages the lug 25 from the notches 26 in the fixed member. A bellcrank 30 is provided which is pivoted on a short shaft 31, journaled in brackets 32 riveted to the outer channel-shaped member 14. The long arm of the bellcrank is adapted to cooperate with the manual handle 30a, while the short arm 33 of the bellcrank performs the function of the cam member as already described. The manual handle 30a extends perpendicularly to a convenient position readily available to an operator positioned on the seat block.

In Figures 7, 8 and 9 another modification of the latching device is illustrated, in which a bellcrank 35 is provided, the long arm of which cooperates with an upwardly extending manual handle 36 and whose short arm 37 performs a similar function as the cam member already described. The bellcrank is keyed to a longitudinally extending shaft 38, which is journaled in apertures in a bracket 39 suitably attached to the outer channel-shaped member 14. The shaft 38 extends a short distance beyond the forward terminus of the channel-shaped member 14 and is provided at its end with a depending arm 40 which is keyed thereto. The arm 40 is provided with an aperture with which cooperates a transversely extending rod 41 by means of a right angle bend which projects through an aperture in the arm 40. The runner positioned at the opposite end of the seat block is provided in a similar manner in which the rod 41 cooperates with an arm similar to the arm 40 to rotate the longitudinally extending shaft similar to the shaft 38, so that a cam member similar to the cam member 37 is adapted to reciprocate the transverse bar to release the latching lug from cooperation with notches formed on the fixed member. In this manner, the manual handle 36 is capable of controlling both runners to release the lugs from their locking relation with the notches on the fixed member.

Referring to Figure 9, the notches provided in the fixed member to cooperate with the lug for locking purposes are positioned in short section 42 of angle-iron, riveted securely to the base of the inner channel-shaped member. The cam member 37 is adapted to thrust the transverse bar to the left in this figure so as to release the lug from the notches in the angle-iron section. To return the transverse bar so as to place the lug in locking relation with a notch, a spring means 43, similar to the one already described, is provided to thrust the transverse bar to the right (Figure 9).

In this construction, the longitudinally extending shaft 38 is preferably positioned below the transverse bar, so that the cam member 37 will thrust the transverse bar to the left upon actuation of the handle 36 to perform the unlocking as has already been described. With the longitudinal shaft 38 in this position and extending toward the forward end of the outer channel member 14, the transverse rod 41 is given better clearance than would be available if the transverse rod 41 extended to the opposite runner at a central position. In general, more clearance is available adjacent the front end of the runners, so that the transverse bar 41 may move without being impeded during the locking and unlocking periods of the seat adjusting device.

It is to be understood that the above detailed description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the claims beyond the requirements of the prior art.

What is claimed is:

1. In a device of the class described, a channel-shaped runner with inturned flanges on each leg thereof, a second channel-shaped runner fitted between the inturned flanges of the first channel-shaped member and having outwardly extending flanges to cooperate with the inturned flanges on the first channel-shaped member, spherical anti-friction means positioned between the base of the first channel-shaped member and the outwardly extending flanges of the second channel-shaped member, raised portions extending longitudinally on the second channel-shaped member rising above the level of the outwardly extending flanges to cooperate with the spherical anti-friction members, spherical anti-friction means positioned between the outwardly extending flanges on the second channel-shaped member and the inturned flanges of the first channel-shaped member, and means to lock the channel-shaped members in selected longitudinally-adjusted positions.

2. In a device of the class described, a channel-shaped runner member with inturned flanges on each side thereof, a second channel-shaped runner member fitted between the inturned flanges of the first channel-shaped member and having outwardly-extending flanges to cooperate with the inturned flanges on the first channel-shaped member, spherical anti-friction means positioned between and in contact with the outwardly-extending flanges of the second channel-shaped member and the legs of the angles formed between the bottom and sides of the first channel-shaped member, and spherical anti-friction means positioned between and in contact with the legs of the angles formed between the sides and the inturned flanges of the first channel-shaped member, said anti-friction means contacting the legs of the angles formed between the outwardly-extending flanges and the sides of the second channel-shaped member.

3. In a device of the class described, a channel-shaped runner member with inturned flanges on each side thereof, a second channel-shaped runner member fitted between the inturned flanges of the first channel-shaped member and having outwardly-extending flanges to cooperate with the inturned flanges on the first channel-shaped member, raised portions adjacent the base of the outwardly-extending flanges of the second channel-shaped member extending longitudinally thereof, spherical anti-friction means positioned between the outwardly-extending flanges exteriorly of the raised portions of the second channel-shaped member and the angles formed between the bottom and sides of the first channel-shaped member, and spherical anti-friction means positioned between the angles formed between the sides and the inturned flanges of the first channel-shaped member and the angles formed between the outwardly-extending flanges and the sides of the second channel-shaped member.

4. In a device of the class described, a channel-shaped runner member with inturned flanges on each side thereof, a second channel-shaped runner member fitted between the inturned flanges of the first channel-shaped member and having outwardly-extending flanges to cooperate with the inturned flanges on the first channel-shaped member, said outwardly-extending flanges being curved at their base to form an abutting surface, spherical anti-friction means positioned between the outwardly-extending flanges of the second channel-shaped member against the abutting surface thereof and the angles formed between the bottom and the sides of the first channel-shaped member, spherical anti-friction means positioned between the angles formed between the sides and the inturned flanges of the first channel-shaped member and the angles formed between the outwardly-extending flanges and the sides of the second channel-shaped member, and means extending transversely of the first channel-shaped member to cooperate with the edge of an outwardly-extending flange of the second channel-shaped member to lock the channel-shaped members in selected longitudinally-adjusted positions.

5. In a device of the class described, a channel-shaped runner member with inturned flanges on each side thereof, a second channel-shaped runner member fitted between the inturned flanges of the first channel-shaped member and having outwardly-extending flanges to cooperate with the inturned flanges on the first channel-shaped member, runways having a curved section formed in the angle between the bottom and the sides of the first channel-shaped member, spherical anti-friction means having a radius slightly smaller than the curvature of said runways positioned between the outwardly-extending flanges of the second channel-shaped member and said runways, a second set of runways having a curved section formed in the angle between the inturned flanges and sides of the first channel-shaped member, and spherical anti-friction means positioned between said second set of runways and the angles formed between the sides and the outwardly-extending flanges of the second channel-shaped member.

6. In a device of the class described, a channel-shaped runner member with inturned flanges on each side thereof, a second channel-shaped runner member fitted between the inturned flanges of the first channel-shaped member and having outwardly-extending flanges to cooperate with the inturned flanges on the first channel-shaped member, runways having a curved section formed in the angle between the bottom and the sides of the first channel-shaped member, spherical anti-friction means having a radius slightly smaller than the curvature of said runways positioned between the outwardly-extending flanges of the second channel-shaped member and said runways, raised portions on said outwardly-extending flanges to form an abutting surface for said spherical anti-friction means, a second set of runways having a curved section formed in the angle between the inturned flanges and sides of the first channel-shaped member, spherical anti-friction means positioned between said second set of runways and the legs of the angle formed between the sides and the outwardly-extending flanges of the second channel-shaped member, and means transversely movable of the first channel-shaped member cooperating with the edge of an outwardly-extending flange of the second channel-shaped member to lock the channel-shaped members in selected longitudinally-adjusted positions.

7. In a device of the class described, a channel-shaped runner member with inturned flanges on each side portion thereof, a pair of runways formed in the angles between the base and the side portions of the channel-shaped member, a second pair of runways formed in the angles between the side portions and the inturned flanges of the channel-shaped member, spherical anti-friction means positioned in each runway, the spherical anti-friction means contacting each side portion of the channel-shaped member being adapted to cooperate together, a member longitudinally movable relative to the channel-shaped member positioned in parallel relation with the base of the channel-shaped member at a point intermediate between the base and the inturned flanges, being held in such relative position by cooperation with and the cooperative relation of the spherical anti-friction means contacting the respective side portions of the channel-shaped member, and vertically disposed abutting surfaces on said longitudinally movable member to cooperate with the spherical anti-friction means to prevent lateral movement of the movable member.

8. In a device of the class described, a channel-shaped runner member with inturned flanges on each side portion thereof, a pair of runways formed in the angles between the base and the side portions of the channel-shaped member, a second pair of runways formed in the angles between the side portions and the inturned flanges of the channel-shaped member, spherical anti-friction means positioned in each runway, the spherical anti-friction means contacting each side portion of the channel-shaped member being adapted to cooperate together, a member longitudinally movable relative to the channel-shaped member positioned in parallel relation with the base of the channel-shaped member at a point substantially midway between the base and the inturned flanges, being held in such relative position by cooperation with and the cooperative relation of the spherical anti-friction means contacting the respective side portions of the channel-shaped member, vertically disposed abutting surfaces on said longitudinally movable member to cooperate with the spherical anti-friction means to prevent lateral movement of the movable member, and means to lock the channel-shaped member and the movable member in selected longitudinally-adjusted positions.

THOMAS G. MOULDING.